United States Patent [19]

Sherif

[11] Patent Number: 5,451,557

[45] Date of Patent: Sep. 19, 1995

[54] PRECURSOR FOR FORMING METAL CARBIDE CATALYSTS

[75] Inventor: Fawzy G. Sherif, Stony Point, N.Y.

[73] Assignee: Akzo Nobel N.V., Arnhem, Netherlands

[21] Appl. No.: 201,475

[22] Filed: Feb. 24, 1994

[51] Int. Cl.⁶ .............................................. B01J 23/30
[52] U.S. Cl. .................................. 502/177; 423/352;
423/437 R; 423/439; 423/440; 423/441; 423/442
[58] Field of Search ................ 502/177; 423/439, 440, 423/441, 442, 352, 437 R

[56] References Cited

U.S. PATENT DOCUMENTS

| 4,155,928 | 5/1979 | Finch | 502/177 |
|---|---|---|---|
| 4,950,626 | 8/1990 | Birchall et al. | 501/88 |
| 5,196,389 | 3/1993 | Dubots et al. | 502/178 |
| 5,256,451 | 10/1993 | Philipp et al. | 427/374.2 |
| 5,321,161 | 6/1994 | Vreugdenhil et al. | 502/177 |
| 5,338,716 | 8/1994 | Triplett et al. | 502/177 |

FOREIGN PATENT DOCUMENTS 2634665 2/1977 Germany.
43479 11/1974 Japan.

OTHER PUBLICATIONS

Chemische Berichte vol. 98, pp. 3588–3599 (1965).
Inorganic Chemistry, vol. 10, No. 12, 1971, pp. 2745–2750.

Primary Examiner—Anthony McFarlane
Attorney, Agent, or Firm—Richard P. Fennelly; Louis A. Morris

[57] ABSTRACT

A process for forming a metal carbide catalyst, for example, a Group VIB transition metal carbide, such as tungsten carbide, which may be on a support, which process comprises the calcination of a precursor comprising a water soluble salt of: (1) a cation comprising nitrogen-hydrogen bonded moieties, such as a guanidine cation; and (2) an anion, such as a tungstate anion, comprising metal-oxygen bonded moieties, so that upon calcination the product formed is the metal carbide and the by-products comprise ammonia and carbon dioxide.

17 Claims, No Drawings

PRECURSOR FOR FORMING METAL CARBIDE CATALYSTS

BACKGROUND OF THE INVENTION

Certain disclosures exist in the art regarding the formation of unsupported metal carbide compositions, including those which are catalytic, by the calcination of precursors for such catalysts. Some recent examples include: the following:

U.S. Pat. No. 3,976,749 to H. Wedemeyer teaches the formation of monocarbides of metals by forming a mixture of carbon with an oxalate of the metal and then decomposing the metal oxalate in the presence of an external source of carbon in a stream of hydrogen.

Japanese Patent Publication No. 54/107,500 also teaches the use of a source of extraneous carbon with an organic titanic ester in order to form titanium carbide fine powder ceramics.

M. A. Janney in U.S. Pat. No. 4,622,215 proposed that titanium carbide powder could be formed from a carbon precursor polymer and an organo-titanate as reagents. The titanium moieties in the resulting product are deemed to be substituents to the polymer chain(s) carrying the carbon moieties in the reaction product which is then converted into the desired ceramic after pyrolysis. The patent mentions that a gel is formed.

U.S. Pat. No. 4,948,762 to W. Krumbe et al. forms carbides by reacting metal-containing compounds with a reactive hydrocarbon-containing compound, which is polymerizable and which contains a carbon-hydroxy bond. J. D. Birchall et al., in U.S. Pat. Nos. 4,861,735 and 4,950,626 also describes the production of ceramic materials by reacting a compound containing a metallic or non-metallic element having at least two groups that are hydroxy-reactive with an organic compound containing at least two hydroxy groups. In U.S. Pat. No. 4,861,735 it is stated in the first Example that the carbide precursor is formed as a waxy solid.

U.S. Pat. No. 4,826,666 to R. M. Laine utilizes metal alkyls or carbonyls in the preparation of metal carbide precursors and illustrates only certain polymeric precursor structures at Col. 4, line 65 to Col. 5, line 32.

Metal carbides can also be formed by the pyrolysis of a composition containing the desired metal (such as derived from a metal alkoxide or metal halide) and a carboxylic acid residue (such as from a dicarboxylic acid). See U.S. Pat. No. 5,169,808.

More recently, in U.S. Ser. No. 156,670, filed Nov. 23, 1993, it has been proposed that catalytic metal carbides can be formed by the calcination of a guanidine compound, adduct, or derivative and a transition metal salt, such as a transition metal halide.

A variety of disclosures also exist in the art in regard to how to form a supported metal carbide catalyst.

The prior art describes the impregnation of a support with a water soluble source of the metal alone, followed by calcination to the metal oxide, with subsequent exposure of the oxide to carburizing gases, such as methane/hydrogen (See S. T. Oyama et al., Ind. Eng. Chem. Res., 27, 1639(1988)) or carbon monoxide (See P. N. Ross, Jr. et al., J. of Catalysis., 48, 42(1977)). Both carburization reactions necessitate the use of high temperatures on the order of about 900° C. L. Leclercq et al., in U.S. Pat. No. 4,522,708, discusses several supported carbide systems, including work by Mitchell and co-workers in supporting molybdenum on active carbon and other work relating to Group VI metals on alumina (e.g., U.S. Pat. Nos. 4,325,843 and 4,326,992). In all these processes, uncontrollable gases lead to formation of deposited free carbon. This carbon is undesirable and have to be eliminated as described by the authors, by exposing the final catalyst to a stream of hydrogen gas.

D. Dubots in U.S. Pat. No. 5,196,389 describes a metallic carbide obtained by coating the support with two components: a suspension of a reducible compound of the metal and a solution of an organic resin forming compound followed by carburization at 700° C.–1400° C. A temperature of 1000° C. was needed to carburize the reduced metal with the organic resin forming compound. During carburization, carbon may be deposited on the active metal carbide sites, rendering them useless. This deposited carbon leads to an artificially high surface area. This phenomena is described by Ledoux et al., J. of Catalysis, 134, 383(1992). The high temperature needed for carburization often leads to a highly crystalline material as described by its X-ray diffraction (XRD) pattern. Sharp peaks in the XRD indicate large crystallites, i.e., a small specific surface area. Yet, in one example, Ledoux claims surface areas of 147 and 168 $m^2.g^l$ for $Mo_2C$ and WC, respectively.

Flynn et al., in Inorganic Chemistry, 10, 2745(1971), describe a water insoluble guanidinium metatungstate of the formula $(CN_3H_6)_6(H_2W_{12}O_{40})\cdot 3H_2O$, where the metal to guanidine ratio is 1:0.5. This insoluble compound will not dissolve in water to allow impregnation of porous materials for catalyst manufacture.

K. F. Jahr et al., in Chemische Berichte, 98, 3588–3599 (1965), describe a water soluble guanidinium tungstate $(CN_3H_6)_2WO_4$ where the ratio of metal to guanidine is 1:2. This compound was prepared by the reaction of ethyl tungstate solution in ethanol with guanidine free base. This compound was also prepared by the instant inventor, using a different process as will be shown below, and was found not to give the desired catalytic tungsten carbide of this invention.

DESCRIPTION OF THE INVENTION

This invention relates to a novel process for forming a metal carbide catalyst, which may be a supported catalyst, involving the calcination of a novel water soluble precursor for the metal carbide which precursor is made by a one-step chemical reaction between a transition metal-containing compound and a carbon containing compound which is low in carbon content. In the broadest embodiment of the invention, the precursor used in the process is a water soluble salt of: (1) a cation comprising nitrogen-hydrogen bonded moieties with a high nitrogen to carbon content; and (2) an anion comprising metal-oxygen bonded moieties, so that upon calcination the product formed is the metal carbide and the by products comprise ammonia and carbon dioxide. The precursor contains both a metal source, such as the Group VIB transition metal, tungsten, and a carbon source, such as a guanidine compound. Guanidine carbonate, which is of the formula $(CN_3H_5)_2H_2 CO_3$, contains only 20% carbon and is an example. The precursor in very soluble in water. Its high solubility allows for the preparation of supported catalysts, for example, by impregnation. It allows the use of less volume of a solvent, not exceeding the pore volume of a chosen support that will be impregnated with the solution in those cases when a supported catalyst is desired. This process, which is known as the "incipient wetness method", is preferred for the manufacture of such supported catalysts. The incipient wetness method requires that the volume of the solution be equivalent to the pore volume of the chosen support. Upon calcination of the impregnated support, equal dispersion of the active component on the support will result. High solubility of the precursor will also allow increasing the metal loading on the support at will.

In order to synthesize a high surface area, high porosity tungsten carbide catalyst, supported on an inert substrate, such as alumina, it is preferred to have a precursor of the metal carbide in a form, soluble in water. The precursor is preferably a single compound and not a mixture of two components. It does not produce excess carbon upon calcination that would block the catalytic pore properties. The composition of the precursor is made from one metal to one to five carbon atoms, preferable three carbon atoms. The carbon atoms are directly bonded to nitrogen atoms. The nitrogen atoms may be connected to hydrogen or other atoms. The carbon-nitrogen entity forms a cation attached chemically to the metal in the form of an anion with the cation having a high nitrogen to carbon content, preferably at a nitrogen to carbon atomic ratio of 3.0 to 1 or higher. The reaction can be described by the following generalized (unbalanced) equation:

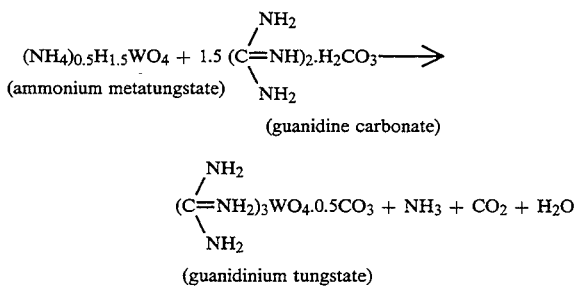

(ammonium metatungstate)

(guanidine carbonate)

(guanidinium tungstate)

Calcination of the novel precursor, for example, guanidinium tungstate, at temperatures of from about 500° C. to about 800° C. gives tungsten carbide ($W_2C$) in substantially pure form. If exposed to air, this material may form a monolayer of $W_2CO$. The bulk material produced by this calcination shows catalytic properties known for the carbides of the transition metals. During the calcination, the precursor components will interact, whereby the organic source will reduce the metal ion source within the same molecule and form a metal-carbon bond as a metal carbide, which would be substantially free of undesirable free carbon as represented by the following generalized (unbalanced) equation:

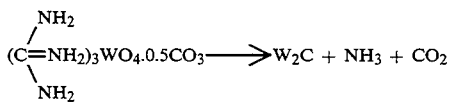

This calcination step does not involves carburization. It is a chemical reduction of the metal ion with the carbon-nitrogen ion of the same compound or from the ammonia released thereafter. It is believed that ammonia will reduce the tungstate ion into a lower oxidation state, which will in situ chemically react with the carbon in the same molecule forming carbides. The result is a metal carbide containing substantially no excess carbon, which is well dispersed over the support, giving a high surface area catalyst. The ratio of the guanidine to the metal was found to be important for forming a metal carbide suitable for use as a catalyst for reactions such as isomerization of n-heptane. For example, it will be shown later that if the ratio of guanidine to the metal is less than three, other phases such as nitridic or metallic phases will be the main component. These phases will result in the undesirable cracking of heptane to lower hydrocarbons. When the ratio is 3:1, the only phase would be $W_2C$. The solution of guanidinium tungstate would also be easily impregnated into the porous support in one step, then calcined at an industrially reasonable temperature not exceeding 800° C.

The novel precursor of this invention in its broadest embodiment comprises a guanidinium cation and a transition metal-containing anion with the guanidinium to transition metal ratio being at least about 3:1, preferably about 3:1. The transition metal can be a Group VIB transition metal, such as tungsten, and the preferred anion is a tungstate. A molybdate anion can also be selected.

A new composition of matter, formed by the solid state reaction of ammonium metatungstate and guanidine carbonate at 100°–200° C., was found to be: (1) completely soluble in water; (2) decomposable at 228° C., which is different from decomposition temperature of the reactants; (3) contains 35–50% tungsten; (4) contains 5–10% carbon; (5) contains 20–30% nitrogen; (6) has a characteristic X-Ray diffraction pattern not found before; (7) forms mainly tungsten carbide, $W_2C$, containing substantially no free carbon, when heated at 600°–850° C. under nitrogen, such carbide showing catalytic activity in chemical hydrotreating reactions known to occur with noble metals, such as platinum and palladium; and (8) aqueous solutions of composition are dry impregnable by the incipient wetness method into solid supports prior to calcination, making it possible to produce supported metal carbide catalysts.

In those embodiments where a support is desired in the final catalyst, one can select such oxidic support materials as alumina, silica, alumina-silica, zeolite, diatomaceous earth, molecular sieve, titania, zirconia, or any combination thereof. The support can also be coated with a protective ceramic layer (such as, of silicon carbide, boron nitride, or combination) as described and claimed in U.S. Ser. No. 984,192, filed Dec. 1, 1992.

The following Examples further illustrate the present invention.

EXAMPLE 1

The new composition of the present invention was prepared by admixing 8.1 g, 0.09 mole, of guanidine carbonate from Aldrich Chemicals Inc. with 7.6 g, 0.03 mole, of ammonium metatungstate from Metal Elements Ltd. The resulting mixture was heated at 150° C. for five hours. An alternative process involves wetting the dry mixture with about 20% water. This practice has been found to reduce the heating time of 150° C. to one hour. The product was found to be soluble in water. Certain unique properties of the new composition and of those of the reactants are given below:

|  | New Composition | Ammonium m-tungstate | Guanidine carbonate |
| --- | --- | --- | --- |
| Melting or decomposition temperature | 226–228° C. | >300° C. | >300° C. |
| Elemental Analysis:* | | | |
| % W: | 41.3 | 72.6 | 20 |

|  | New Composition | Ammonium m-tungstate | Guanidine carbonate |
|---|---|---|---|
| % C: | 9.7 | — | — |
| % H: | 3.9 | 1.2 | 6.7 |
| % N: | 26.9 | 2.7 | 46.6 |
| Solubility: | soluble | soluble | soluble |
| pH of solution in water: | 9 | 2 | 12 |

*the values given are "found" values. The calculated values for $(CH_3H_6)_3WO_4 \cdot 0.5CO_3$ are: 40.2% W; 9.2% C; 3.9% H; and 27.5% N.

When a solution of 8.1 g guanidine carbonate in 30 ml water (0.09 mole) was mixed with a solution of 7.6 g ammonium tungstate (0.03 mole) in 30 ml water, a white precipitate was formed. The precipitate was insoluble in water even at boiling temperature. Only after continuous boiling for over two hours did the white solid start to go in solution. The insolubility of the precipitate in water made it difficult to impregnate a porous support. However, when the two reactants were admixed in the solid state and heated as above, the product was found to be soluble in water.

EXAMPLE 2

When the material prepared according to Example 1 was calcined at 750° C. under nitrogen for two hours, a black powder was obtained. The powder was characterized by XRD as mainly $W_2C$ having the following XRD peak parameters:

| Peak | 2-Theta | D-Space | I (Rel) |
|---|---|---|---|
| 1 | 34.550 | 2.5940 | 22.92 |
| 2 | 38.000 | 2.3660 | 23.64 |
| 3 | 39.600 | 2.2740 | 100.00 |
| 4 | 40.400 | 2.2308 | 45.08 |
| 5 | 52.350 | 1.7463 | 13.98 |
| 6 | 58.350 | 1.5802 | 8.79 |
| 7 | 61.950 | 1.4967 | 15.84 |

Thermogravimetric analysis of the powder was carried out in air. It showed an increase in weight from 25° C. to 800° C. of 22%. This value corresponds to the calculated increase in weight of tungsten carbide ($W_2C$) to tungsten trioxide ($WO_3$). Therefore, the material was judged to have substantially no carbon content.

The powder was evaluated as a catalyst for the isomerization of n-heptane. Half a gram of the material was placed in a micro-reactor tube and was pre-activated with hydrogen at 500° C. for four hours. The flow of hydrogen 10 cc/min. Hydrogen was then passed through a reservoir containing n-heptane at room temperature. The n-heptane saturated gas stream was passed over the catalyst at a temperature of 350° C. The conversion of n-heptane was determined by gas chromatography, in comparison to the feed composition. After three hours on stream, a steady state was approached. The conversion of heptane was 20%, with a selectivity of 91% to isomers, mainly of methyl hexanes, 8% hydrogenolysis to low $C_1$–$C_6$ hydrocarbons, and 1% of mainly benzene and toluene.

EXAMPLE 3

A precursor was prepared according to Example 1, was calcined at 675° C. instead of 750° C. as described in Example 2. The material was found to be $W_2CO$ by XRD. The oxygen-containing phase was formed during partial oxidation of the material during handling. One gram of the powder was evaluated as a catalyst as described in Example 1. At 350° C., the conversion of n-heptane was found to be only 12%. The selectivity was 70% to isomers, 29% to low hydrocarbons, and 1% to aromatics.

COMPARATIVE EXAMPLE 4

This Example shows that when guanidine carbonate and ammonium tungstate were reacted in a molar ratio of 2:1, diguanidinium tungstate was formed. A solution of 18 g of guanidine carbonate (0.2 mole) in 50 ml water was mixed with a solution of 25.3 g of ammonium metatungstate (0.1 mole) in 50 ml water. A white precipitate was formed. A slurry of this precipitate was boiled for two hours, then diluted to 200 ml volume and boiled for an extra thirty minutes. Most of the precipitate in the slurry went into solution. The precipitate was filtered off. The clear solution was mixed with 600 ml of ethanol and was left to cool. Transparent crystals formed. The crystals were filtered, washed with alcohol, and dried at 120° C. for two hours. The decomposition temperature of the crystals was 245° C. Elemental analysis agreed with that of diguanidinium tungstate: Found W: 51, N: 22.5, C: 6.8, H: 2.8% ; Calculated for $(CN_3H_6)_2 WO_4$: W: 49.9, N: 22.8, C: 6.5, H: 3.3%. When this material was calcined at 750° C. under nitrogen for two hours, a black powder was formed. XRD patterns gave a profile similar to tungsten carbide (WC) or tungsten nitride (WN):

| Peak | 2-Theta | D-Space | I (Rel) |
|---|---|---|---|
| 1 | 25.450 | 3.4970 | 70.18 |
| 2 | 32.150 | 2.7819 | 73.68 |
| 3 | 36.300 | 2.4728 | 100.00 |
| 4 | 43.650 | 2.0720 | 54.74 |
| 5 | 53.000 | 1.7264 | 42.11 |

There appeared to be a significant amount of amorphous material.

Thermogravimetric analysis between 150° C. and 900° C. in air showed an increase in weight of 10% which was indicative of the presence of a significant amount of $WO_3$, which has no catalytic activity for the isomerization of hydrocarbons, since the weight gain for WC would be 18%. As will be shown in the following Example, a composition made from guanidine carbonate and ammonium tungstate in a 2:1 ratio gave a poor catalyst.

COMPARATIVE EXAMPLE 5

This Example illustrates that when guanidine and ammonium tungstate are reacted in the solid state in a ratio of 2:1, a poor catalytic material was formed.

Guanidine carbonate (5.4 g, 0.06 mole) was mixed in a mortar with 7.6 g (0.03 mole) of ammonium metatungstate and then heated at 150° C. for four hours forming a water soluble product that gave a pH in solution of 7 and which had a decomposition temperature of 228° C. This material was identified by elemental analysis: Found: W: 50.2%; N: 22.7%; C: 7.0%; H: 2.9%. Calculated for diguanidinium tungstate $(CN_3H_6)_2 WO_4$: W: 49.9%; N:22.8%; C: 6.5%; H: 3.3%. Upon calcination of five grams of this material at 750° C. for two hours, a black powder was formed. XRD patterns showed it to be mainly $W_{0.62}NO$ and $W_2CO$:

| Peak | 2-Theta | D-Space | I (Rel) |
| --- | --- | --- | --- |
| 1 | 22.900 | 3.8804 | 51.09 |
| 2 | 23.650 | 3.7590 | 100.00 |
| 3 | 23.950 | 3.7126 | 50.92 |
| 4 | 24.300 | 3.6599 | 37.44 |
| 5 | 24.650 | 3.6087 | 28.52 |
| 6 | 25.100 | 3.5450 | 28.28 |
| 7 | 36.200 | 2.4794 | 31.18 |
| 8 | 36.750 | 2.4436 | 64.42 |
| 9 | 37.400 | 2.4026 | 78.96 |
| 10 | 37.900 | 2.3720 | 40.78 |
| 11 | 38.500 | 2.3364 | 23.22 |
| 12 | 43.850 | 2.0630 | 58.03 |
| 13 | 44.550 | 2.0322 | 58.63 |
| 14 | 45.150 | 2.0065 | 34.88 |
| 15 | 62.850 | 1.4774 | 40.57 |
| 16 | 63.650 | 1.4608 | 42.53 |
| 17 | 64.150 | 1.4506 | 35.76 |
| 18 | 64.650 | 1.4406 | 39.65 |

Half a gram of this powder was tested as a catalyst similar to the method described in Example 2. At 350° C. the conversion of n-heptane was 33.2%. The selectivity to isomers was only 41.6%, to lower hydrocarbons, hydrogenolysis, 56%, and aromatics 2%. The high hydrocarbons shows that the phases formed were not catalytically suited.

EXAMPLE 6

This Example shows a process for making a supported catalyst in accordance with the present invention.

Ammonium metatungstate (14.9 g, 0.059 mole) was admixed with 15.9 g of guanidine carbonate (0.177 mole) and was heated at 150° C. for three hours. The material was then dissolved in water to obtain a total volume of 38 cc. The solution was added slowly to 40 g of alumina extrudates, ⅛ " diameter, with stirring. The wetted alumina was dried at 150° C. for one hour and was then calcined at 750° C. for two hours. The extrudates turned black. The tungsten loading on alumina was calculated to give 20 w/w %, tungsten on alumina. Half a gram was tested for its catalytic activity as previously described. At 350° C., the conversion was 24% with a selectivity of 78% to isomers, 25% to hydrocarbons and 2% to aromatics. The original supported tungsten carbide on alumina catalyst had a surface area of 160 m²/g. The pore volume was 0.47 cc/g, and the pore diameter was 97 Angstroms. The BET surface area of the original alumina support was 182 m²/g. The high selectivity indicated that such a supported catalyst may be used successfully for the isomerization of hydrocarbons. Its high surface area of 160 m²/g with 20% tungsten, as compared to a bulk material of 100% tungsten as in Example 2, demonstrates its feasibility as a commercially useful catalyst.

The foregoing Examples are presented for illustrative purposes only. The scope of protection is set forth in the Claims which follow.

I claim:

1. A process for forming a metal carbide catalyst which comprises the calcination of a precursor which comprises a water soluble salt of: (1) a cation comprising nitrogen-hydrogen bonded moieties; and (2) an anion comprising metal-oxygen bonded moieties, so that upon calcination the product formed is the metal carbide and the by products comprise ammonia and carbon dioxide.

2. A process as claimed in claim 1 wherein the precursor comprises a Group VIB transition metal.

3. A process as claimed in claim 1 wherein the precursor comprises tungsten as the metal.

4. A process as claimed in claim 1 wherein the precursor comprises a tungstate anion.

5. A process as claimed in claim 1 wherein an oxidic support is impregnated with the precursor before calcination.

6. A process as claimed in claim 5 wherein the support contains a protective layer of ceramic.

7. A process for forming a metal carbide catalyst which comprises the calcination of a precursor which comprises a water soluble salt of: (1) a guanidine cation; and (2) an anion comprising the metal and oxygen, so that upon calcination the product formed is the metal carbide and the by products comprise ammonia and carbon dioxide.

8. A process as claimed in claim 7 wherein the precursor comprises a Group VIB transition metal.

9. A process as claimed in claim 7 wherein the precursor comprises tungsten as the metal.

10. A process as claimed in claim 7 wherein the precursor comprises a tungstate anion.

11. A process as claimed in claim 7 wherein an oxidic support is impregnated with the precursor before calcination.

12. A process as claimed in claim 11 wherein the support contains a protective layer of ceramic.

13. A calcinable, novel precursor for a metal carbide which is water soluble and which comprises a guanidinium cation and a transition metal-containing anion and which has a guanidinium to transition metal ratio of at least about 3:1.

14. A precursor as claimed in claim 13 wherein the ratio is about 3:1.

15. A precursor as claimed in claim 13 wherein the anion comprises a Group VIB transition metal.

16. A precursor as claimed in claim 13 wherein the anion comprises tungsten as the metal.

17. A precursor as claimed in claim 16 wherein the anion is a tungstate anion.

* * * * *